United States Patent [19]

Okubo

[11] Patent Number: 5,092,662
[45] Date of Patent: Mar. 3, 1992

[54] ANTI-LOCK CONTROL METHOD AND APPARATUS FOR VEHICLE

[75] Inventor: Satomi Okubo, Saitama, Japan

[73] Assignee: Akebono Brake Industry Co., Ltd., Tokyo, Japan

[21] Appl. No.: 694,932

[22] Filed: May 2, 1991

[30] Foreign Application Priority Data

May 9, 1990 [JP] Japan .................. 2-117683

[51] Int. Cl.$^5$ ............................ B60T 8/70
[52] U.S. Cl. .................... 303/106; 188/181 C; 303/96; 303/103; 303/108; 364/426.02
[58] Field of Search ............... 303/106, 105, 107, 108, 303/109, 96, 95, 97, 100, 102, 103, 104; 188/181 C; 364/426.02, 426.01, 426.03

[56] References Cited

U.S. PATENT DOCUMENTS

4,929,035 5/1990 Shimanuki ........................ 303/106
4,984,164 1/1991 Maehara et al. .................. 303/96 X
5,028,095 7/1991 Okubo .............................. 303/103 X Primary Examiner—Douglas C. Butler
Attorney, Agent, or Firm—Cushman, Darby & Cushman

[57] ABSTRACT

In an anti-lock control method and apparatus for preventing locking of vehicle wheels during braking, a plurality of pressure increase rates are predetermined correspondingly to various friction coefficients for a road surface, one of pressure increase rates is selected based on an estimated friction coefficient estimated from vehicle deceleration for increasing brake hydraulic pressure, and if it is detected that a lower one of right and left vehicle wheel speeds has risen to vicinity of the vehicle speed for a predetermined time period, the road surface is judged to have sharply changed from a low valued friction coefficient to a high valued friction coefficient along with movement of an automotive vehicle and the selected one of the pressure increase rates is then changed for another one appropriated for the road surface having a high valued friction coefficient.

10 Claims, 6 Drawing Sheets

ANTI-LOCK CONTROL METHOD AND APPARATUS FOR VEHICLE

BACKGROUND OF THE INVENTION

The present invention relates to an anti-lock control method and apparatus for preventing locking of automotive wheels of a running vehicle.

Generally, in an anti-lock control apparatus for automotive vehicles, to maintain steering ability and running stability during braking, a control unit including a micro-computer controls brake hydraulic pressure. This brake pressure control also reduces braking distance.

During operation of the anti-lock control apparatus, a control mode for brake hydraulic pressure is determined based on an electric signal indicative of a wheel speed. This wheel speed is detected by a wheel speed sensor. According to the control mode, a hold valve, which is a normally opened solenoid valve, and a decay valve, which is a normally closed solenoid valve, are selectively opened and closed to increase, hold constant and decrease the brake hydraulic pressure.

In such anti-lock control, in many cases the control is performed by the steps of setting a target slip rate for braking, detecting a difference between an actual wheel speed (hereinafter referred as the wheel speed) and a target speed which is a wheel speed calculated from the target slip rate, and determining the required increase or decrease of the brake hydraulic pressure based on this detected difference and acceleration/deceleration of the wheel speed. Therefore, the wheel speed is rapidly converged to the target speed.

However, since the wheel speed varies due to slight changes on a road surface, the above- mentioned anti-lock control suffers from problems such that the decrease and increase of the brake hydraulic pressure is undesirably repeated many times due to the effect of the change on the road surface. As a result, much time is required to converge the wheel speed to the target speed. Also, the period in which a braking force is insufficient is extended because the brake hydraulic pressure is not rapidly and suitably increased. Thus, the braking distance increases and the deceleration of the vehicle is insufficient.

RELATED ART OF THE INVENTION

Then, the present inventor Satomi Okubo invented a method and apparatus for estimating a coefficient of friction between a road surface and wheels that are anti-lock controlled, and filed to the U.S.P.T.O. on Feb. 13, 1991 (Ser. No. 07/654,779).

In an anti-lock control method including such estimating method, a plurality of pressure increase rates are set in advance according to various road surface friction coefficients $\mu$. The friction coefficients $\mu$ are determined on the basis of an amount of vehicle deceleration occurring during braking of the vehicle and one of the pressure increase rates is selected based on this determination. Then, the brake hydraulic pressure is increased by the selected pressure increase rate.

In accordance with this anti-lock control method, it is possible to rapidly cope with the circumstance when the wheel speed varies due to slight changes on a road surface and therefore providing anti-lock control suitable for various road surfaces.

SUMMARY OF THE INVENTION

The present invention relates to an improvement for the above-mentioned method proposed by the present inventor.

Accordingly, it is an object of the present invention to provide an anti-lock control method for automotive vehicles, in which the brake hydraulic pressure is prevented for becoming insufficient, especially when the road surface has sharply changed from a low valued friction coefficient to a high valued friction coefficient.

In order to attain the above-noted and other objects, the present invention provides an anti-lock control method of preventing locking of vehicle wheels during braking, the method comprising the steps of: setting a plurality of pressure increase rates in advance according various coefficients of friction between a road surface and said vehicle wheels; determining an estimated friction coefficient $\mu$ on the basis of an amount of deceleration of a vehicle speed occurring during braking of the vehicle; selecting one of said pressure increase rates based on the estimated friction coefficient $\mu$; increasing brake hydraulic pressure by the selected one of the pressure increase rates; detecting a state that a lower one of right and left wheel speeds has risen to vicinity of the vehicle speed for a predetermined time period; and changing, in response to the detection of the state, the selected one of the pressure increase rates for another one of the pressure increase rates, which is appropriate for a predetermined high valued friction coefficient.

DETAILED DESCRIPTION OF THE PREFERRED EMBODIMENTS

Preferred embodiments of the present invention will now be described with reference to the accompanying drawings.

Figure 1:
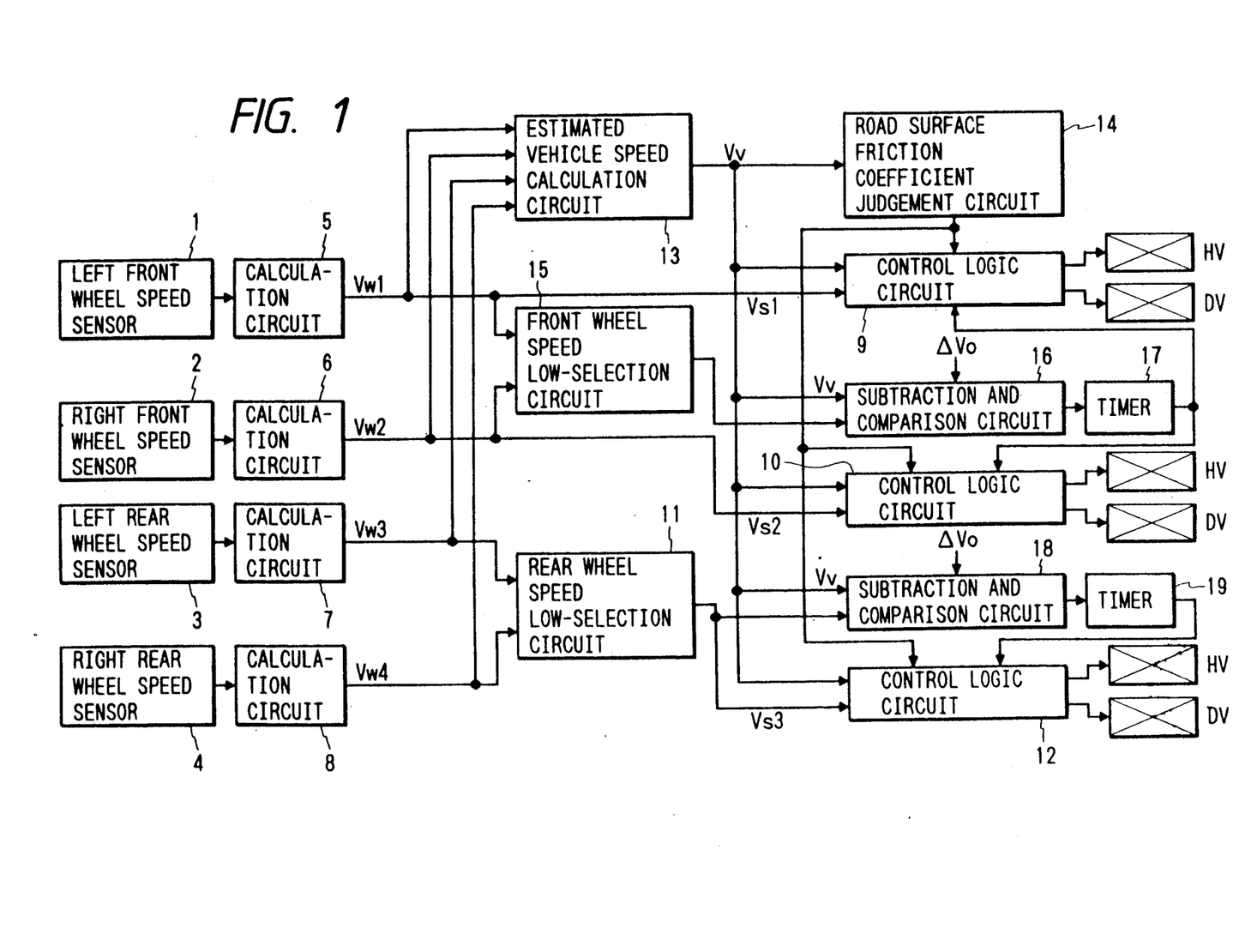
FIG. 1 is a block diagram showing a three-channel anti-lock control apparatus for practicing the present invention.

FIG. 1 is a block diagram showing a three-channel anti-lock control apparatus for practicing the present invention.

Output signals provided by wheel sensors 1 to 4 are transmitted to calculation circuits 5 to 8, respectively. These output signals are indicative of the wheel speeds as detected by wheel sensors 1 to 4, respectively. The right front wheel speed signal Vw1 and the left front wheel speed signal Vw2 are directly transmitted as first and second system speed signals Vs1 and Vs2 to first and second control logic circuits 9 and 10, respectively.

A lower rear wheel speed is selected between the left rear wheel speed signal Vw3 and the right rear wheel speed signal Vw4 in a rear wheel speed low-selection circuit 11. This lower rear wheel speed is transmitted as a third system speed signal Vs3 to a third control logic circuit 12. Each of the control logic circuits 9, 10 and 12 treats the respective system speed signals Vs1, Vs2 or Vs3 as a controlled object. In accordance with the respective system speed signals Vs1, Vs2 and Vs3 which are indicative of the wheel speeds, each of the control logic circuits controls the opening and closing of the hold valve HV and the decay valve DV.

The signals representing the wheel speeds Vw1 to Vw4, respectively, are also transmitted to an estimated vehicle speed calculation means 13. In the estimated wheel speed calculation means 13, the highest wheel speed is selected from among the four wheel speeds Vw1 to Vw4 and an estimated vehicle speed Vv is obtained with a limitation of acceleration/deceleration of $\pm 1G$ which is the limitation of the wheel with the highest speed. The estimated vehicle speed Vv is output to the control logic circuits 9, 10 and 12.

The estimated vehicle speed Vv obtained by the calculation circuit 13 is also provided to a road surface friction coefficient $\mu$ judgment circuit 14. Signals indicative of the road surface friction coefficient $\mu$ as determined by the judgment circuit 14 are output to the control logic circuits 9, 10 and 12. In accordance with these signals, each of the control logic circuits 9, 10 and 12 determines a pressure increase rate from a point at which the brake hydraulic pressure starts to increase.

On the other hand, a lower front wheel speed is selected between the left front wheel speed signal Vw1 and the right front wheel speed signal Vw2 in a front wheel speed low-selection circuit 15. This lower front wheel speed is transmitted to a first subtraction and comparison circuit 16. The first subtraction and comparison circuit 16 calculates remainder in the subtraction of the lower front wheel speed from the estimated vehicle speed and compares this remainder with a minute value $\Delta V_0$. The first subtraction and comparison circuit 16 outputs a signal when the reminder is not greater than the minute value ( Vv−the lower front wheel speed $\leq \Delta V_0$ ). In other words, when the lower front wheel speed has risen to the vicinity of the estimated vehicle speed Vv the first subtraction and comparison circuit 16 generates an output signal to put a timer 17 into timing action. The timer 17 remains in the timing action as long as the circuit 16 keeps generating the output signal. Even before the timer 17 completes the timing action, it is put out of the action if the circuit 16 stops generating the output signal. When the timer 17 has completed the timing action a predetermined time period $\Delta T$ after being put into the action, the first and the second control logic circuits 9 and 10 changes the pressure increase rates for those for the high valued road surface friction coefficient $\mu$, disregarding the determination of the road surface friction coefficient $\mu$ judgement circuit 14.

In the rear wheel control channel of the anti-lock control apparatus, a second subtraction and comparison circuit 18 and another timer 19 are provided between the rear wheel speed low-selection circuit 11 and the third control logic circuit 12 so as to function similar to the first subtraction and comparison circuit 16 and the timer 17. When the timer 19 has completed the timing action thereof, the third control logic circuit 12 changes the pressure increase rate for another one for the high valued road surface friction coefficient $\mu$, disregarding the determination of the road surface friction coefficient $\mu$ judgement circuit 14.

Figure 2:
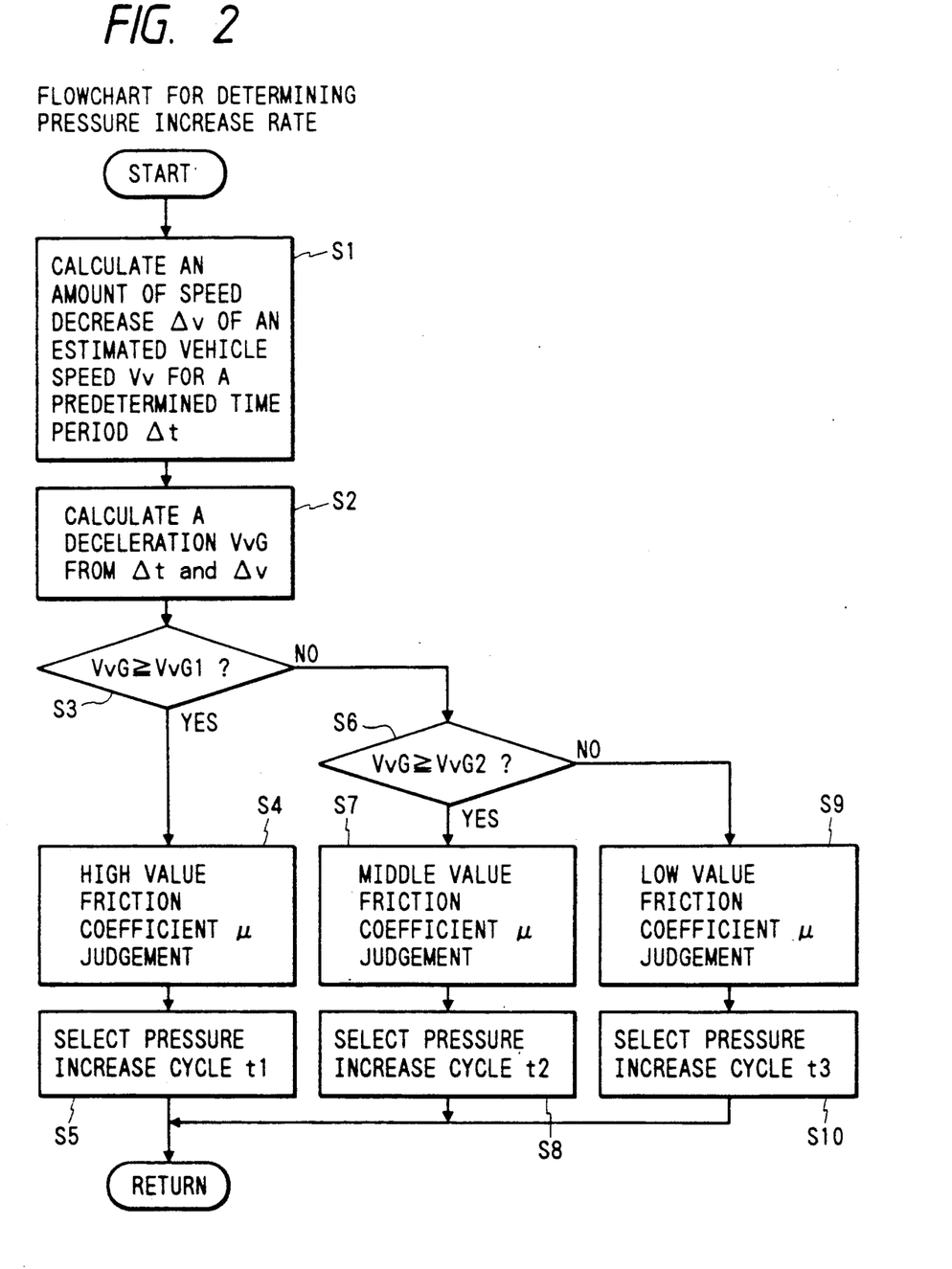
FIG. 2 is a flow chart showing the steps for determining a pressure increase rate.
Figure 3:
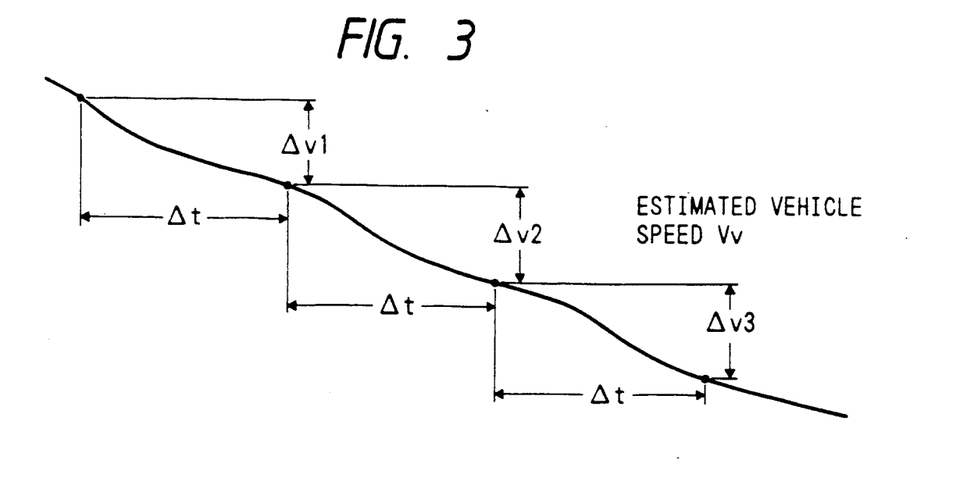
FIG. 3 is an explanatory diagram for a method of judging a road surface friction coefficient $\mu$.

FIG. 2 shows a flow chart indicating a routine in which the pressure increase rate is determined in accordance with the signals indicative of the road surface friction coefficient $\mu$ provided by the road surface friction coefficient $\mu$ judgement circuit 14 (hereinafter judgment circuit 14). The flow chart shown in FIG. 2 will now be explained with reference to FIGS. 3 and 4.

In Step S1, an amount of speed decrease $\Delta V$ of the estimated vehicle speed Vv for a predetermined time period $\Delta t$ is calculated by the judgment circuit 14. In Step S2, a deceleration VvG ($=\Delta V/\Delta t$) of the estimated vehicle speed Vv is also calculated by the judgment circuit 14. In Step S3, judgment circuit 14 determines whether or not the deceleration VvG is equal to or greater than the predetermined first reference deceleration VvG1.

If it is determined in Step S3 that the deceleration VvG is equal to or greater than the first reference deceleration VvG1 (VvG$\geq$VvG1), in Step S4, the road surface friction coefficient $\mu$ is determined to be a high value and the judgment circuit 14 provides signals indicative thereof. In Step S5, the control logic circuits 9, 10 and 12 compare the road surface friction coefficient $\mu$ signals with the estimated vehicle speed signals Vv and the system speed signals Vs1, Vs2 and Vs3, respectively. The control logic circuits 9, 10 and 12, in accordance with the outcome of the above comparison, control the opening and closing of the hold valves HV and decay valves DV and thus perform the pressure increase by the shortest pressure increase cycle t1. This pressure increase cycle t1 is predetermined for the high valued road surface friction coefficient $\Delta$ (shown in FIG. 4).

Figure 4:
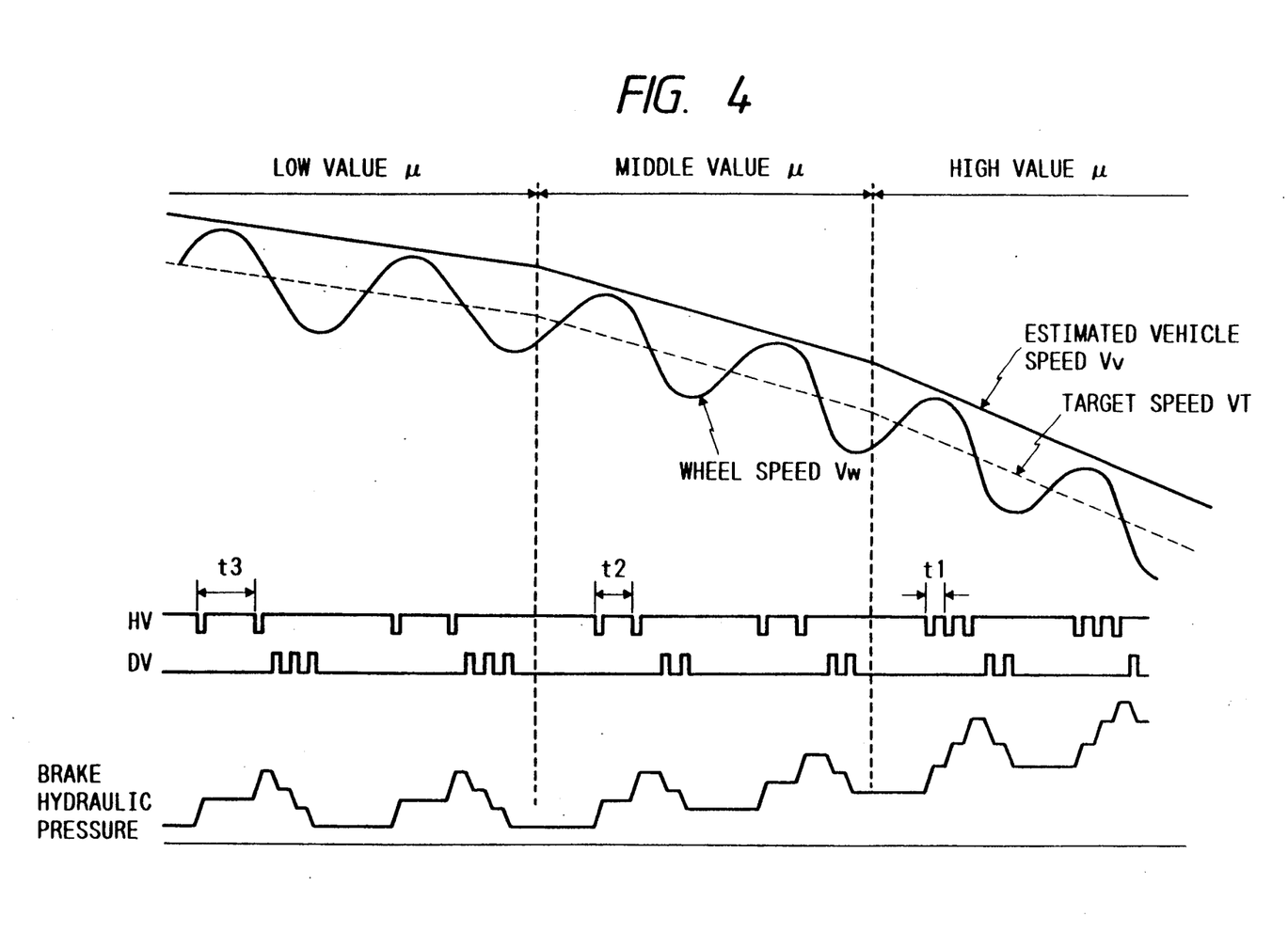
FIG. 4 is a diagram showing a control state in the anti-lock control.

In the embodiment of the present invention, as is apparent from FIG. 4, one pressure increase cycle is defined by one unit comprising a combination of a pressure increase period and a pressure hold period. During a pressure increase cycle, the brake hydraulic pressure is increased in steps by repetition of the pressure increase period and pressure hold period. The pressure increase cycle is varied such that the pressure hold period is changed while the pressure increase period is kept constant.

If in Step S3 the judgment circuit 14 determines that the deceleration VvG is less than the first reference deceleration VvG1 (VvG<VvG1), then in Step S6, the judgment circuit 14 determines whether or not the deceleration VvG is equal to or greater than a predetermined second reference deceleration VvG2. This second reference deceleration VvG2 is less than the first reference VvG1 (VvG2<VvG1).

If the judgment circuit 14 determines in Step S6 that the deceleration VvG is equal to or greater than the second reference deceleration VvG2 (VvG$\geq$VvG2), then in Step S7 the judgment circuit 14 determines the road surface friction coefficient $\mu$ to be a middle valued road surface friction coefficient $\mu$.

In Step S8, the control logic circuits 9, 10 and 12 compare the road surface friction coefficient $\mu$ signals with the estimated vehicle speed signals Vv and the system speed signals Vs1, Vs2 and Vs3, respectively. The control logic circuits 9, 10 and 12, in accordance with the outcome of the above comparison, control the opening and closing of the hold valves HV and decay valves DV and thus perform the pressure increase by a pressure increase cycle t2 (t2>t1). This pressure increase cycle t2 is predetermined for the middle valued road surface friction coefficient $\mu$ (shown in FIG. 4).

On the other hand, if the judgment circuit 14 determines in Step S6 that the deceleration VvG is less than the second reference deceleration VvG2 (VvG<VvG2), in Step 9, the judgment circuit 14 determines the road surface friction coefficient $\mu$ to be low valued.

In Step S10, the control logic circuits 9, 10 and 12 compare the road surface friction coefficient $\mu$ signals with the estimated vehicle speed signals Vv and the system speed signals Vs1, Vs2 or Vs3, respectively. The control logic circuits 9, 10 and 12, in accordance with the outcome of the above comparison, control the opening and closing of the hold valves HV and decay valves DV and thus perform the pressure increase by a pressure increase cycle t3 (t3>t2). This pressure increase cycle t3 is predetermined for the low valued road surface friction coefficient $\mu$ (shown in FIG. 4).

Accordingly, based on a selected one of the pressure increase cycles t1, t2 and t3, a pressure increase rate is determined for the wheels which are anti-lock controlled.

Figure 5:
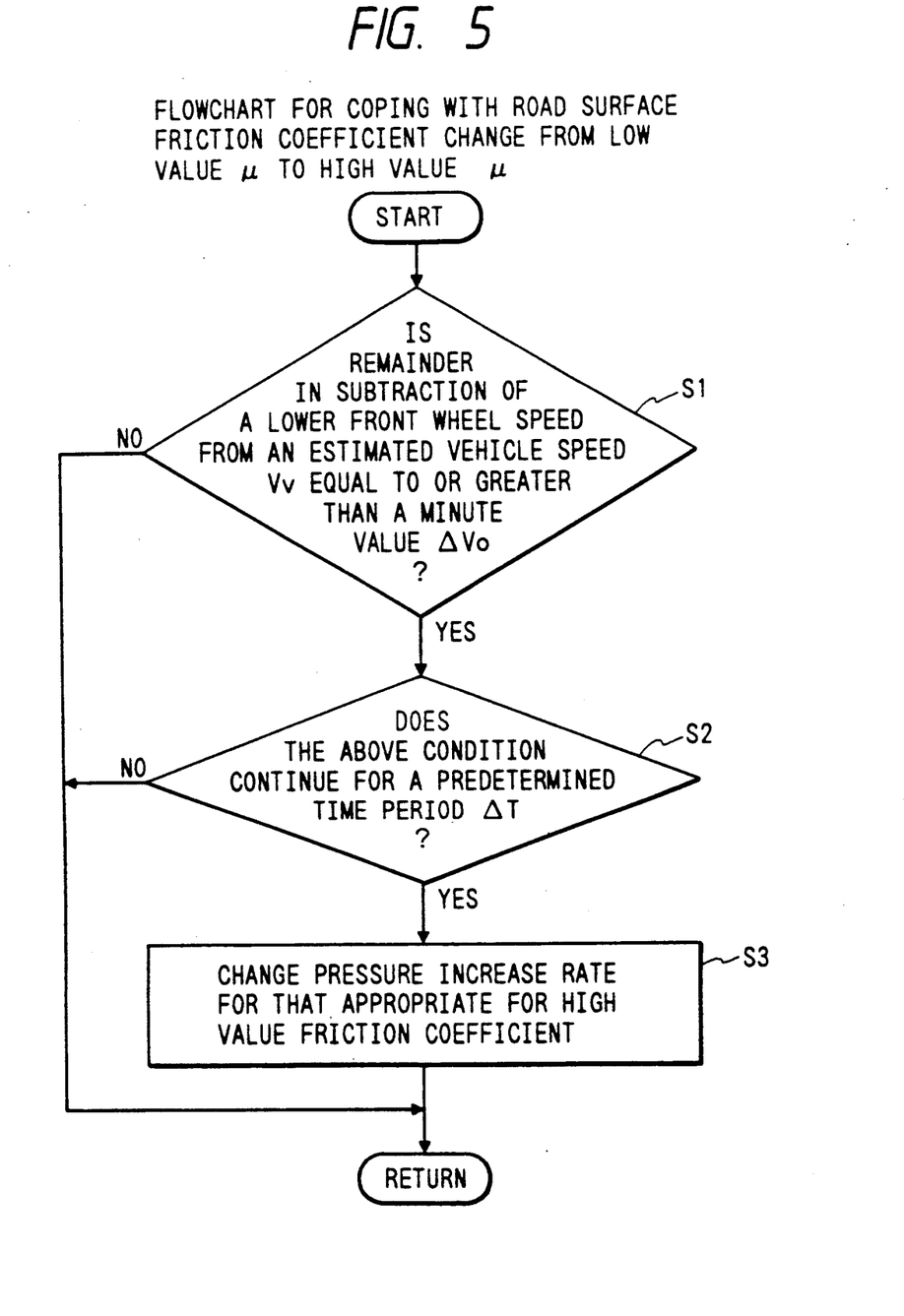
FIG. 5 is a flow chart showing the steps for determining friction coefficient changes from a low value to a high value according to the present invention.

FIG. 5 shows a flow chart indicating a control routine for front wheel control channels to cope with a case where the road surface sharply changes from the low valued friction coefficient $\mu$ to the high valued friction coefficient $\mu$. The routine is described with reference to FIG. 6 as well as FIG. 5 from now on.

Figure 6:
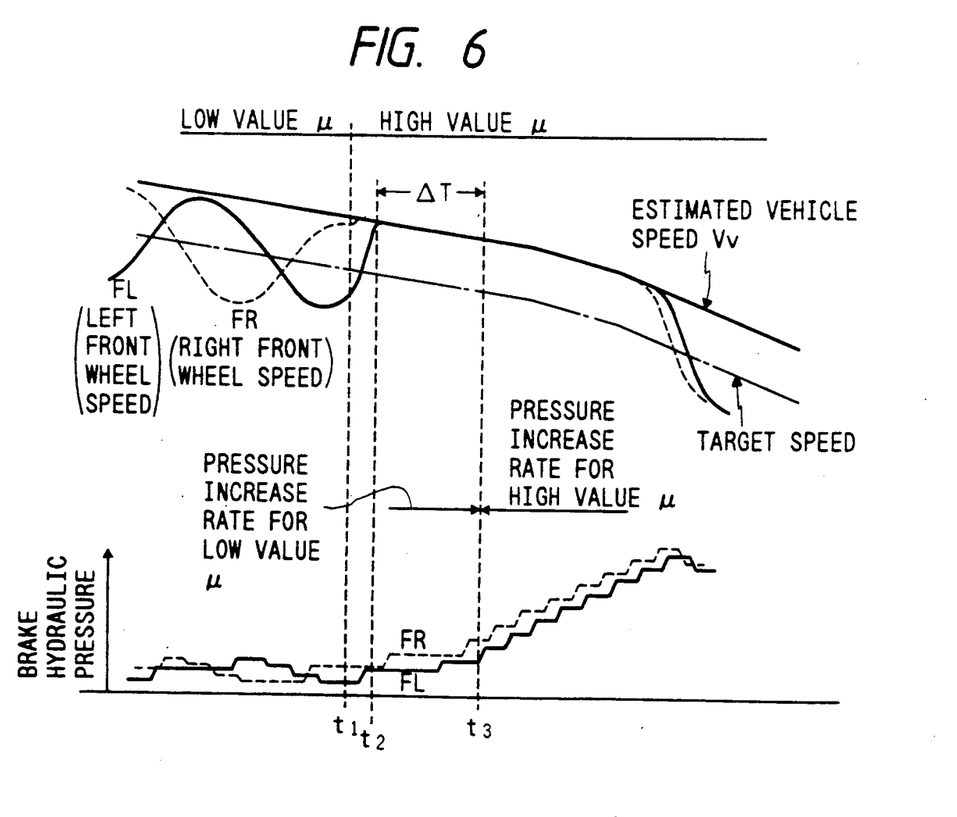
FIG. 6 is a diagram showing a control state to cope with the friction coefficient changes from a low value to a high value according to the present invention.

In Step S1, the first subtraction and comparison circuit 16 determines whether or not the remainder in the subtraction of the lower front wheel speed from the estimated vehicle speed is equal to or smaller than the minute value $\Delta V_0$, namely, the lower front wheel speed has risen to the vicinity of the estimated vehicle speed, as at a time point t2 shown in FIG. 6. This means judging whether or not the front left wheel speed FL and the front right wheel speed FR have both risen to the vicinity of the estimated vehicle speed Vv. If in Step S1 the circuit 16 determines that the remainder is equal to or smaller than the minute value $\Delta V_0$, the timer 17 is put into timing action at the time point t2, for example. Then in Step S2, it is determined through the use of the timer 17 whether or not the lower front wheel speed has risen to the vicinity of the estimated vehicle speed Vv for the predetermined time period $\Delta T$ from the time point t2. If it is determined in Step S2 that the lower front wheel speed has risen to the vicinity of the estimated vehicle speed Vv for the predetermined time period $\Delta V$ at another time point t3 in FIG. 6, the road surface is determined to have sharply changed from the low valued friction coefficient to the high valued friction coefficient.

According to this determination, in Step S3 the pressure increase rates of the brake hydraulic pressure for the right and left front wheel are, respectively, changed for those for the high valued road surface friction coefficient $\mu$, that is, those having the shortest pressure increase cycles t1.

On the other hand, if it is determined in Step S2 that the lower front wheel speed has not risen to the vicinity of the estimated vehicle speed Vv for the predetermined time period $\Delta T$, the timer is put out of the timing action.

In addition, changing the pressure increase rate in the control routine is performed with priority over the pressure increase rate determination routine shown in FIG. 2.

Figure 7:
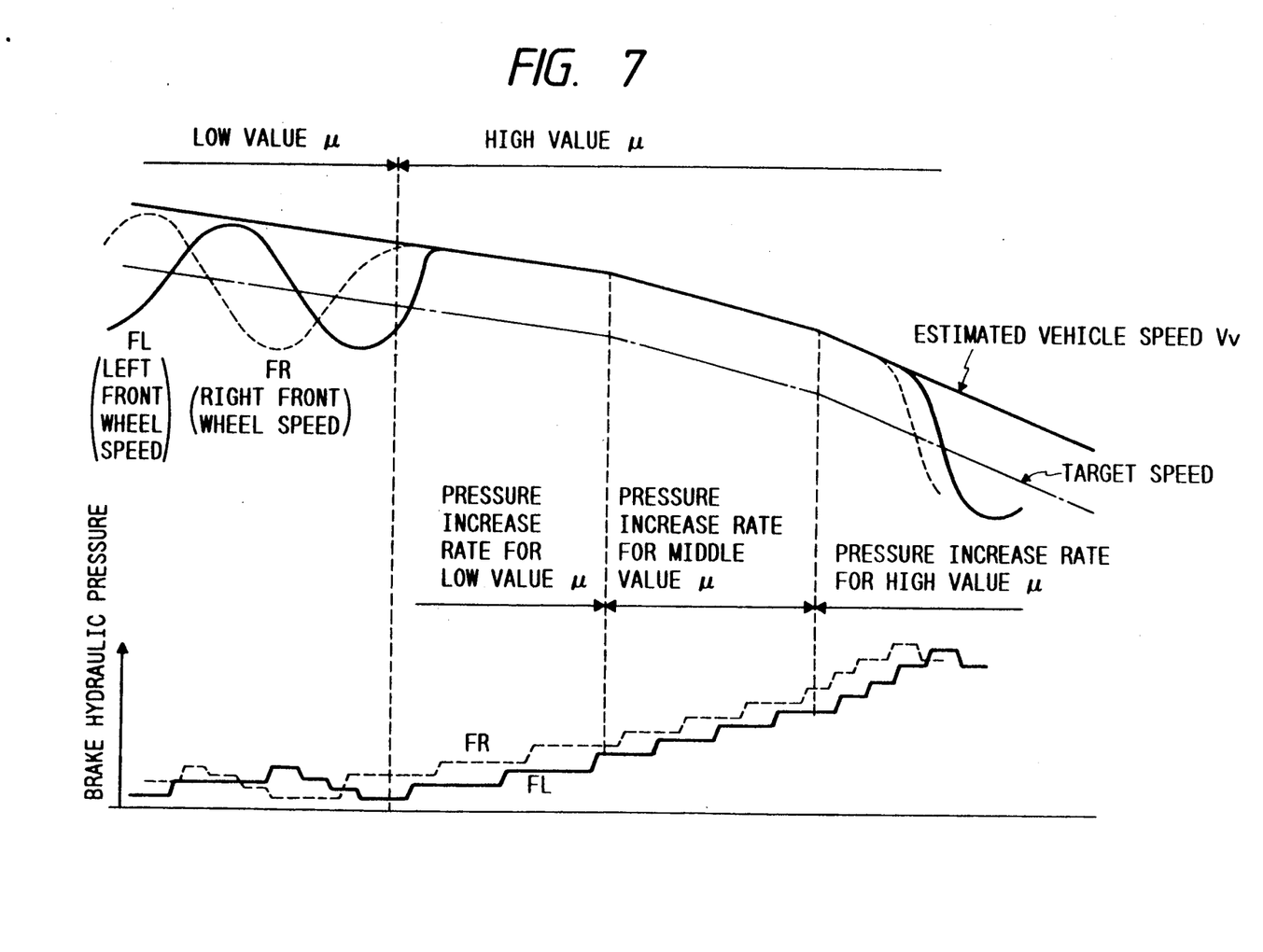
FIG. 7 is a comparative diagram showing another control state practiced in an anti-lock control method, which was previously filed by the present inventor.

FIG. 7 is a time chart indicating anti-lock control operation for the front wheel control channel in a case where the pressure increase rate determination routine is executed without being interrupted by the above-mentioned control routine at the time of the change in the road surface from the low value to the high value. Since the decrease rate VvG in the estimated vehicle speed Vv does not sharply change even if the vehicle moves directly from the road surface having the low valued friction coefficient $\mu$ onto the road surface having the high valued friction coefficient $\mu$, the road surface friction coefficient $\mu$ judgement circuit 14 determines the road surface friction coefficient $\mu$ to be the low valued road surface friction coefficient $\mu$, the middle valued road surface friction coefficient $\mu$ and the high valued road surface friction coefficient $\mu$ in this order based on such decrease rate VvG in the estimated vehicle speed Vv. As a result, each of the control logic circuits 9, 10 and 12 selects the pressure increase rate for the low valued road surface friction coefficient $\mu$, that for the middle valued road surface friction coefficient $\mu$ and that for the high valued road surface friction coefficient $\mu$ in this order, as shown in FIG. 7.

On the other hand, in the case of the execution of the above-mentioned control routine for coping with the change in the road surface from the low valued friction coefficient $\mu$ to the high valued friction coefficient $\mu$, the pressure increase rate for the low valued road surface friction coefficient $\mu$ is not changed for that for the middle valued road surface friction coefficient $\mu$ but directly changed for that for the high valued friction coefficient $\mu$ at the time point t3 at which the vehicle is determined to have moved from the road surface having the low valued friction coefficient $\mu$ onto that having the high valued friction coefficient $\mu$, as shown in FIG. 6. For that reason, the brake hydraulic pressure can be increased at the appropriate pressure increase rate earlier than in the case where the road surface friction coefficient $\mu$ is estimated only on the basis of the changes in the decrease rate VvG of the estimated vehicle speed Vv. This results in making the braking distance of the vehicle shorter than in the case.

Although the control routine for coping with changes in the road surface from the low valued friction coefficient $\mu$ to the high valued friction coefficient $\mu$ is executed for the front wheel anti-lock control channels, such a control routine can be executed for the rear wheel anti-lock control channel in the same manner as for the front wheel anti-lock channels if the lower rear wheel speed provided from the rear wheel speed low-selection circuit 11 is handled instead of the lower front wheel speed and pressure increase rates are changed for each other for the brake hydraulic pressure for the right and left rear wheels of the vehicle.

What is claimed is:

1. An anti-lock control method of preventing locking of vehicle wheels during braking, said method comprising the steps of:
   setting a plurality of pressure increase rates in advance according various coefficients of friction between a road surface and said vehicle wheels;
   determining an estimated friction coefficient $\mu$ on the basis of an amount of deceleration of a vehicle speed occurring during braking of the vehicle;
   selecting one of said pressure increase rates based on said estimated friction coefficient $\mu$;
   increasing brake hydraulic pressure by said selected one of said pressure increase rates;

detecting a state that a lower one of right and left wheel speeds has risen to vicinity of said vehicle speed for a predetermined time period; and changing, in response to the detection of said state, said selected one of said pressure increase rates for another one of said pressure increase rates, which is appropriate for a predetermined high valued friction coefficient.

2. The method according to claim 1, wherein said detecting step includes the steps of:

calculating remainder in subtraction of said lower one of right and left wheel speeds from said vehicle speed comparing said remainder with a predetermined minute value $\Delta V_0$ to detect said state; and outputting the detection of said state when said remainder has not been greater than said minute value $\Delta V_0$ for said predetermined time period.

3. The method according to claim 1, wherein said vehicle speed is calculated based on a highest wheel speed among wheel speeds of all said vehicle wheels.

4. The method according to claim 1, wherein said pressure increase rates includes at least three pressure increase rates appropriate for predetermined low, middle and high valued friction coefficients, respectively.

5. The method according to claim 1, wherein each of said plurality of pressure increase rates is defined by a time period in which said brake hydraulic pressure is increased and a respective time period in which said brake hydraulic pressure is held constant.

6. The method according to claim 1, wherein the method is practiced independently for vehicle front wheels and for vehicle rear wheels.

7. An anti-lock control apparatus for preventing locking of vehicle wheels during braking, said anti-lock control apparatus comprising:

a plurality of detecting means for detecting wheel speeds and providing wheel speed signals indicative thereof;

first circuit means for determining a slowest rear wheel speed from said wheel signals indicative of speeds of rear wheels and providing a slowest rear wheel speed signal indicative thereof;

second circuit means for determining a fastest wheel speed from said signals provided by said plurality of detecting means and providing a vehicle speed signal indicative of said fastest wheel speed;

third circuit means for calculating a vehicle deceleration in accordance with said vehicle speed signal and comparing said vehicle deceleration with predetermined vehicle decelerations to obtain an estimated vehicle road surface friction coefficient, said second circuit means providing an estimated road surface friction coefficient signal indicative of said estimated road surface friction coefficient;

a plurality of fourth circuit means for selecting one of predetermined pressure increase rates in accordance with said estimated road surface friction coefficient signal and providing brake pressure control signals based on said selected one of predetermined pressure increase rates in accordance with said vehicle speed signal, said estimated road surface friction coefficient signal, and one of said slowest rear wheel speed signal and said wheel speed signals;

fifth circuit means for determining a slowest front wheel speed from said wheel speed signals indicative of speeds of front wheels and providing a slowest front wheel speed signal indicative thereof; and sixth circuit means for detecting a first predetermined condition in accordance with said vehicle speed signal and said slowest front wheel speed signal and changing, in response to the detection, said selected one of said pressure increase rates regarding brake pressure control of said front wheels for another one of said pressure increase rates, which is appropriate for a first predetermined high valued friction coefficient.

8. The apparatus according to claim 7, further comprising:

seventh circuit means for detecting a second predetermined condition in accordance with said vehicle speed signal and said slowest rear wheel speed signal and changing, in response to the detection, said selected one of said pressure increase rates regarding brake pressure control of said rear wheels for yet another one of said pressure increase rates, which is appropriate for a second predetermined high valued friction coefficient.

9. The apparatus according to claim 7, wherein said first predetermined condition is defined whereby said slowest front wheel speed has been equal to or greater than a speed which is slower a predetermined minute speed $\Delta V_0$ than said wheel speed for a predetermined time period $\Delta T$.

10. The apparatus according to claim 8, wherein said second predetermined condition is defined whereby said slowest rear wheel speed has been equal to or greater than a speed which is slower a predetermined minute speed $\Delta V_0$ than said wheel speed for a predetermined time period $\Delta T$.

* * * * *